(12) United States Patent
Thomas

(10) Patent No.: US 8,641,807 B2
(45) Date of Patent: Feb. 4, 2014

(54) HOLLOW-FIBER MEMBRANE CASTING SOLUTION ADDITIVE FOR RAPID SOLVENT REMOVAL

(75) Inventor: Adam Glen Thomas, Chicago, IL (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 13/017,998

(22) Filed: Jan. 31, 2011

(65) Prior Publication Data

US 2012/0192719 A1    Aug. 2, 2012

(51) Int. Cl.
B01D 53/22 (2006.01)

(52) U.S. Cl.
USPC .............. 96/10; 95/43; 95/45; 96/8; 96/4

(58) Field of Classification Search
USPC .................... 95/43, 45; 96/8, 10, 4
See application file for complete search history.

(56) References Cited

U.S. PATENT DOCUMENTS

| | | | |
|---|---|---|---|
| 3,940,469 A * | 2/1976 | Steigelmann et al. | 264/209.1 |
| 4,039,499 A * | 8/1977 | Steigelmann et al. | 524/173 |
| 4,108,764 A * | 8/1978 | Kaneko et al. | 210/651 |
| 4,871,494 A | 10/1989 | Kesting et al. | |
| 5,181,940 A * | 1/1993 | Bikson et al. | 95/47 |
| 5,273,657 A | 12/1993 | Nakashima et al. | |
| 5,326,675 A * | 7/1994 | Niki et al. | 430/326 |
| 5,954,966 A * | 9/1999 | Matsuura et al. | 210/640 |
| 6,017,474 A | 1/2000 | Teo | |
| 6,495,041 B2 * | 12/2002 | Taniguchi et al. | 210/321.89 |
| 6,858,141 B2 * | 2/2005 | Kulkarni et al. | 210/500.43 |
| 7,524,924 B2 | 4/2009 | Hann | |
| 7,662,212 B2 | 2/2010 | Mullette et al. | |
| 8,268,041 B2 * | 9/2012 | Ekiner et al. | 95/45 |
| 2003/0141238 A1* | 7/2003 | Herczeg | 210/321.87 |
| 2005/0006302 A1 | 1/2005 | Kharul et al. | |
| 2009/0320849 A1* | 12/2009 | Biedermann | 128/206.28 |
| 2010/0108599 A1 | 5/2010 | Vizvardi et al. | |
| 2011/0030382 A1* | 2/2011 | Eadon et al. | 60/780 |
| 2011/0146492 A1* | 6/2011 | Dopkins et al. | 96/10 |

* cited by examiner

*Primary Examiner* — Jason M Greene
*Assistant Examiner* — Anthony Shumate
(74) *Attorney, Agent, or Firm* — Shimokaji & Associates, P.C.

(57) ABSTRACT

Hollow fiber membranes, such as those used in air separation modules, are generally made from solution spinning. Typically, solvent is present in the bore of the fiber for the spinning process. This solvent, in addition to the solvent already present in the polymer casting solution, may cause voids in the fiber material. By adding a polycarboxylic acid to the polymer casting material, these voids may be reduced or eliminated.

14 Claims, 4 Drawing Sheets

HOLLOW-FIBER MEMBRANE CASTING SOLUTION ADDITIVE FOR RAPID SOLVENT REMOVAL

BACKGROUND OF THE INVENTION

The present invention generally relates to air separation module (ASM) fiber material and methods for preparing ASM fiber material and, more particularly, to ASM fiber material formulated using a polycarboxylic acid in a polymer casting solution.

ASMs are a key component for the nitrogen generation systems (NGS) needed to provide fuel tank inerting for commercial and military aircraft. Useful membranes for separating oxygen from nitrogen must have sufficient selectivity to distinguish between these two similar gases, and must also have high flux. Hollow fiber membranes are often used as ASMs.

Hollow fiber membranes are generally made from solution spinning, which introduces a large amount of solvent into the middle "bore" of the hollow fiber. This high concentration of solvent, along with the solvent already present in the polymer casting solution, may yield large void spaces in the walls of the fiber. These void spaces may weaken the structure of the hollow fiber and lower the pressure rating of the fiber.

While several types of hollow fiber membrane morphologies exist, it is believed that a hollow fiber with a gradient porosity (and effectively, gradient density) reduces the risk of initial defects, as well as defects exposed during operation. A defect in the context of a hollow fiber membrane (HFM) may be defined as an opening or path through the dense selective layer of the HFM through which both permeate and retentate matter pass with lessened, little or no restriction. This causes the overall selectivity of the membrane to decrease, and with enough (or severe enough) occurrences of defects, the membrane may be rendered useless.

When the morphology of the HFM is controlled via formulation and/or processing, the chance of random defects causing loss of performance or failure is lowered significantly. To form a HFM with gradient porosity requires the rapid removal of solvent from the fiber wall during the HFM production process.

Referring to FIGS. 1 and 2, there are shown cross-sectional views of a hollow fiber membrane formed by conventional methods. A hollow fiber membrane 100 was prepared using 28% of a polyimide in a polymer casting solution consisting of NMP, IPA, acetone and dioxolane. The fiber membrane 100 was spun into a room temperature water bath and drawn onto a take-up roller.

Referring to FIGS. 3 and 4, there are shown cross-sectional views of a second hollow fiber membrane formed by conventional methods. A second hollow fiber membrane 105 was prepared using 28% of the same polyimide of FIGS. 1 and 2 in a polymer casting solution consisting of NMP, IPA, acetone and dioxolane. The fiber membrane 105 was spun into a room temperature water bath and drawn onto a take-up roller.

In both of these hollow fiber membranes 100, 105, void spaces 110 can be seen in the wall of the hollow fiber membranes 100, 105. As can be seen from comparing FIGS. 2 and 4, the frequency (per volume fiber) and size of these void spaces 110 may vary between batches made of similar materials.

As can be seen, there is a need for a hollow fiber membrane formulation and methods for producing hollow fiber membranes that may reduce or eliminate the void spaces in the walls of the fibers.

SUMMARY OF THE INVENTION

In one aspect of the present invention, a polymer casting solution comprises a solvent; a non-solvent; between about 0.5 to about 10 weight percent polycarboxylic acid admixed in the solvent to give a polycarboxylic acid solution; and a polymer dissolved in the polycarboxylic acid solution, the polymer having a concentration between about 25 and about 30 percent by weight.

In another aspect of the present invention, a hollow fiber membrane formed by solution spinning a polymer casting solution, the polymer casting solution including a solvent, a non-solvent, between about 0.5 to about 10 weight percent of a polycarboxylic acid, and a polymer.

In a further aspect of the present invention, a method for preparing a hollow fiber membrane comprises adding a polycarboxylic acid to a solvent to form a polycarboxylic acid solution; adding the polycarboxylic acid solution to a polymer to give a polymer solution having a final polymer concentration of about 25 to about 30 weight percent; and spinning the polymer solution in a water bath to form a hollow fiber membrane.

These and other features, aspects and advantages of the present invention will become better understood with reference to the following drawings, description and claims.

DETAILED DESCRIPTION OF THE INVENTION

Figure 1:
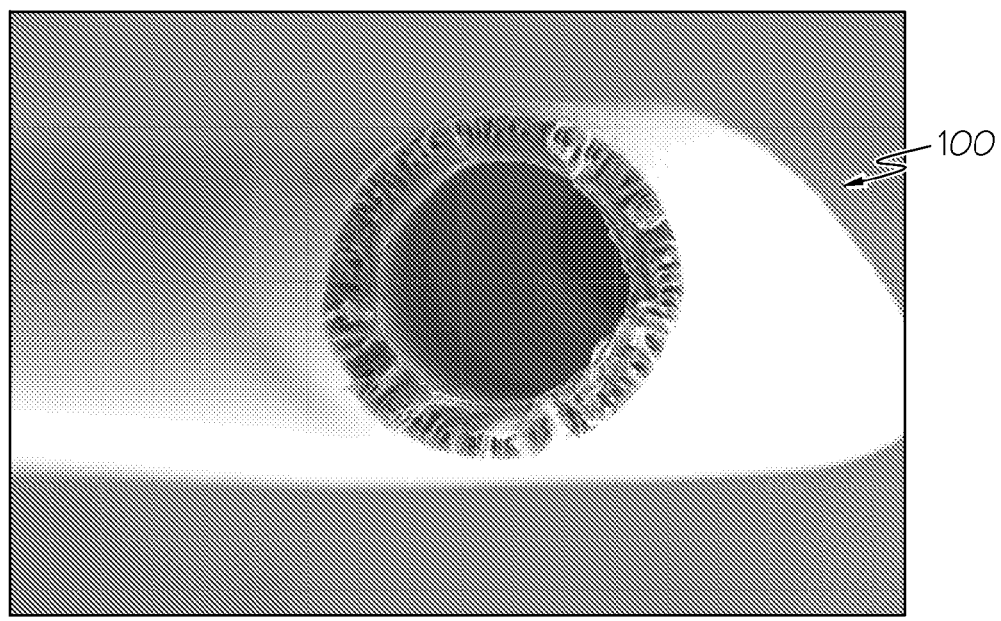
FIG. 1 is a cross-sectional view of a hollow fiber membrane according to the prior art.
Figure 2:
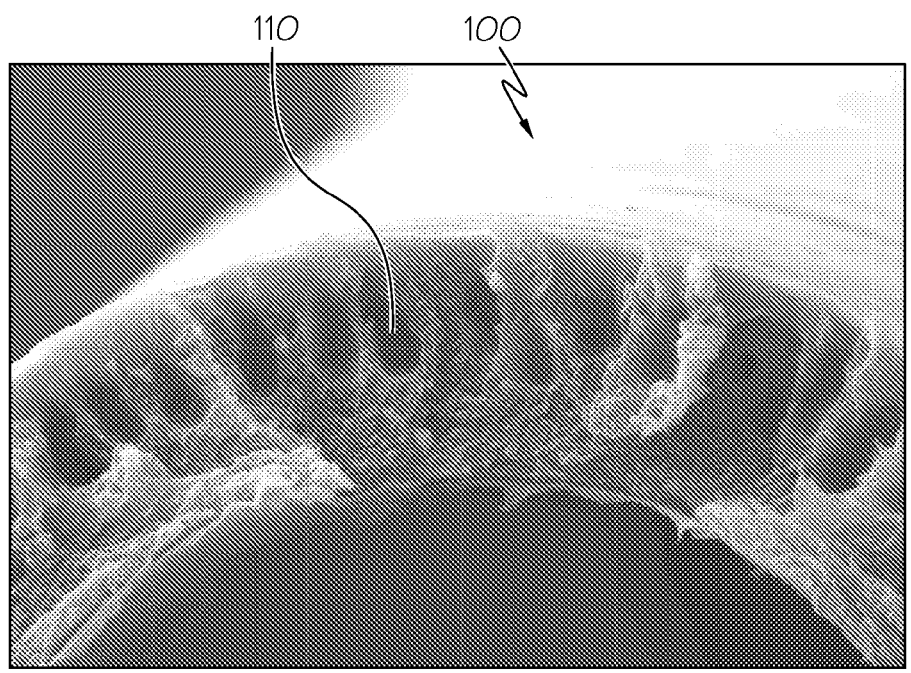
FIG. 2 is a close-up view of the comparative example of FIG. 1.
Figure 3:
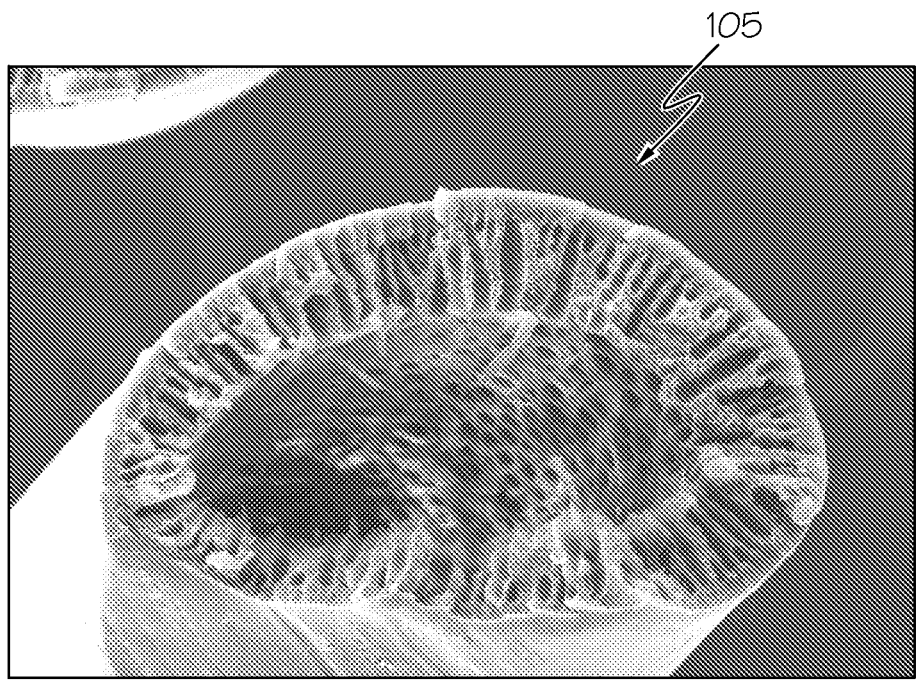
FIG. 3 is a cross-sectional view of a second hollow fiber membrane according to the prior art.
Figure 4:
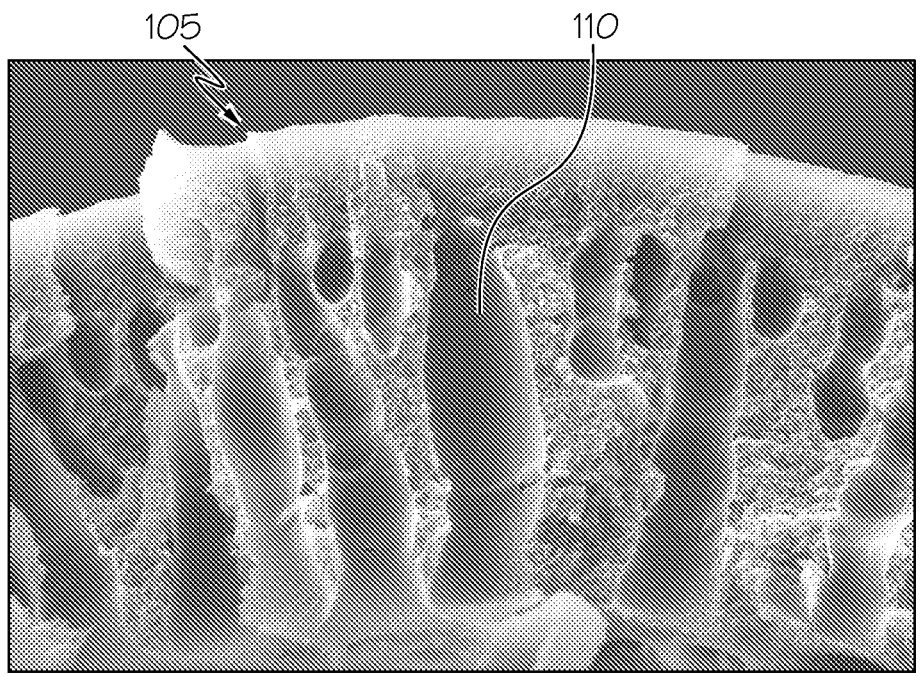
FIG. 4 is a close-up view of the comparative example of FIG. 3.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide an air separation module fiber material formulation and methods for making air separation module fiber modules. Hollow fiber membranes are generally made from solution spinning. Typically, solvent is present in the bore of the fiber for the spinning process. This solvent, in addition to the solvent already present in the polymer casting solution, may cause voids in the fiber material. By adding a polycarboxylic acid, such as citric acid, oxalic acid, fumaric acid, succinic acid, tartaric acid, malic acid, or mellitic acid, to the polymer casting material, according to an exemplary embodiment of the present invention, these voids may be reduced or eliminated.

Embodiments of the present invention may find beneficial use in industries such as the automotive, electricity generation and aerospace industries. Embodiments of the present invention may be beneficial in applications including manufacturing and repair of aerospace components. Embodiments of the present invention may be useful in applications including inerting fuel tanks and other compartments, such as cargo holds. Embodiments of the present invention may be useful in any gas separation application including, but not limited to, NGS.

Generally, the polymer casting solution includes a polymer or mixture of polymers, along with a solvent or solvents (i.e., N-methylpyrollidone (NMP), tetrahydrofuran (THF), 1,3-dioxolane, and the like) and non-solvents (i.e., acetone, isopropanol and the like). The ratio of solvent to non-solvent is known in the art to have an effect on a wide variety of fiber properties, including fiber morphology.

While studies have shown that acid-base complexes in the casting solution may lead to a desirable morphology, the exemplary embodiment of the present invention identifies that one or more polycarboxylic acids may reduce or eliminate voids in the fiber membrane final product.

While not being limited to any particular theory, it has been observed that a polymer casting solution, including one or more polycarboxylic acids (typically between about 0.5 to about 10 weight percent polycarboxylic acid), would solidify or coagulate almost instantly when exposed to water. This may occur due to the polycarboxylic acid's affinity for water, and the fact that the acid had bound itself to the solvent NMP, thus drawing the solvent out of the polymer casting solution faster than previously seen when polycarboxylic acid is not present in the polymer casting solution. The increased rate of solvent leeching may result in a fiber morphology that may have a uniform pore structure, and where the aforementioned void spaces may be reduced or eliminated.

The polymer used in the polymer casting solution may be, for example, polymers known in the art to form hollow fiber membranes. For example, polysulfones, poly (ether sulfones) and polyimides may be useful polymers to form hollow fiber membranes. For some embodiments, useful polymers may include polycarbonates, polyphenyl ethers, polyethers, aromatic polyamides, polycarbonates, polysilicones, polyetherimides, polyestercarbonates, copolymers incorporating these polymer types, and mixtures thereof. In an exemplary embodiment, the polyimide "A", as shown prepared in the reaction scheme below, may be used in the present invention.

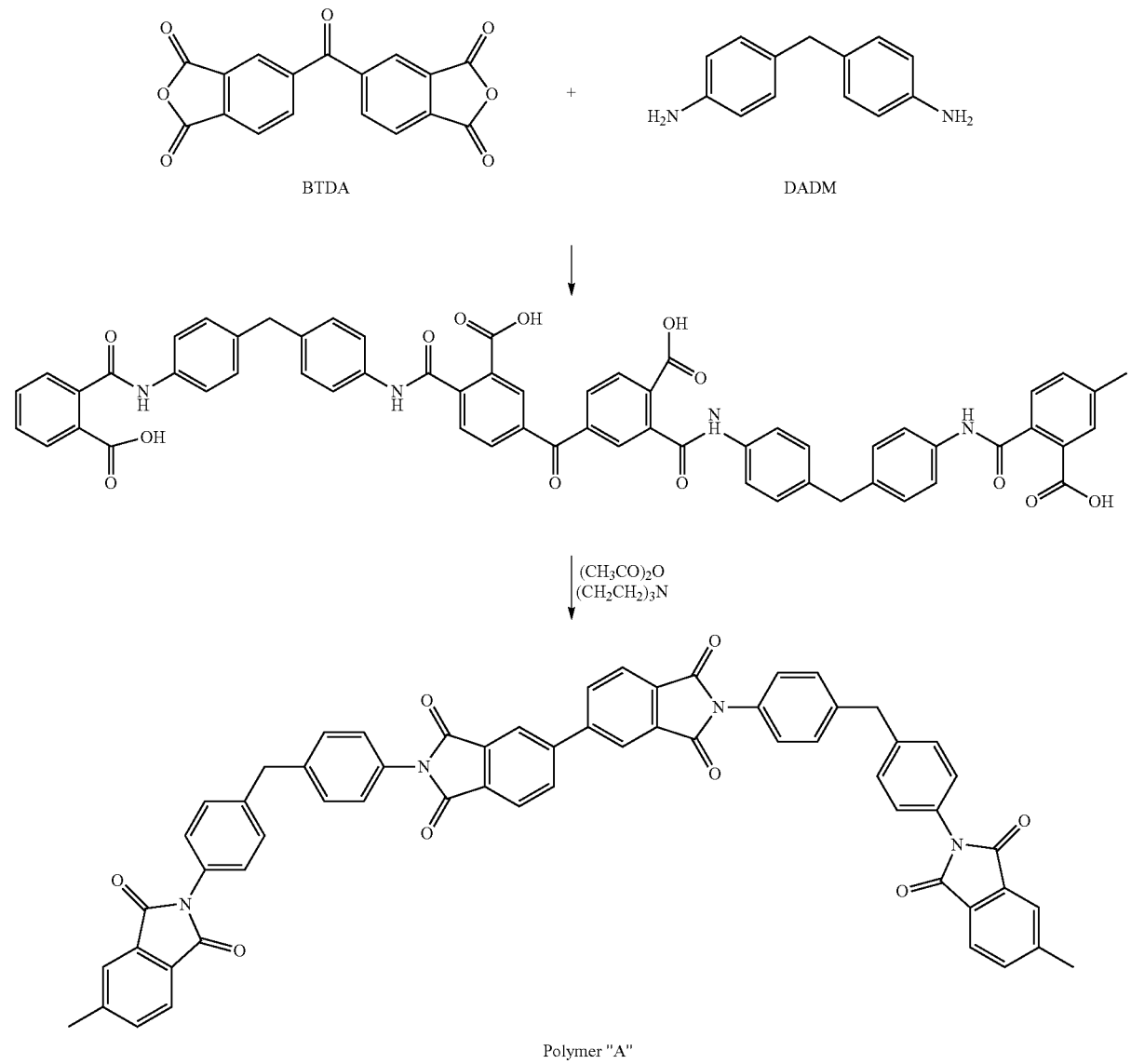

Polymer "A"

EXAMPLES

General Preparation A—Polymer Casting Solution Formulation

The polymer casting solution, according to an exemplary embodiment of the present invention, may be prepared according to the following general preparation. To a solution of a basic solvent (such as NMP, dimethyl acetamide, dimethyl formaide, formylpiperidine, and the like) and non-solvent (such as acetone or a $C_1$-$C_6$ alkanol, for example isopropanol (IPA), methanol, ethanol, propanol, or butanol) is added one or more polycarboxylic acids. The resulting solution is added dropwise to a polymer to give a solution that is from about 10 to about 30 percent by weight of the polymer. The resulting solution is mixed slowly with low shear at room temperature until no solid polymer is present. The resulting solution may be allowed to degas (for example, by bubbling nitrogen gas therethrough) overnight before use.

The final solution, before addition of the polymer, typically contains from about 55 to about 85 weight percent solvent, from about 5 to about 30 weight percent non-solvent, and from about 0.5 to about 10% weight polycarboxylic acid. In an exemplary embodiment of the present invention, the final solution contains from about 70 to about 80 weight percent solvent, from about 15 to about 25 weight percent non-solvent, and from about 4 to about 8 weight percent polycarboxylic acid.

General Preparation B—Formation of Polymer "A"

The synthesis of polymer "A" may involve two steps. In the first, the anhydride (in this case 3,3',4,4'-benzophenone tetracarboxylic dianhydride (BTDA), and the diamine (in this case 4,4'-diaminodiphenyl-methane (DADM) are mixed at room temperature in an NMP solution. This produces the intermediate polyamic acid product. To complete polyimide preparation, a dehydrating agent, acetic anhydride, is added along with triethylamine to scrub the resulting acid, generating the final polyimide. This final step is done portionwise, and is accompanied by a significant increase in viscosity. Once further addition of acetic anhydride has no additional effect, the product is precipitated by removing it with a pipette and adding it to excess methanol.

Example 1

A hollow fiber membrane was prepared using 22.0 weight percent polymer A in a polymer casting solution consisting of 54 weight percent NMP, 20 weight percent IPA and 4 weight percent citric acid. The fiber membrane was spun into a room temperature water bath and drawn onto a take-up roller.

Figure 5:
FIG. 5 is a cross-sectional view of a hollow fiber membrane according to an exemplary embodiment of the present invention.

As can be seen from FIG. 5, by using polycarboxylic acid in the polymer casting solution formulation, voids, such as the void spaces 110 of FIGS. 1-4 were reduced or eliminated in the resulting hollow fiber membranes.

Methods

Figure 6:
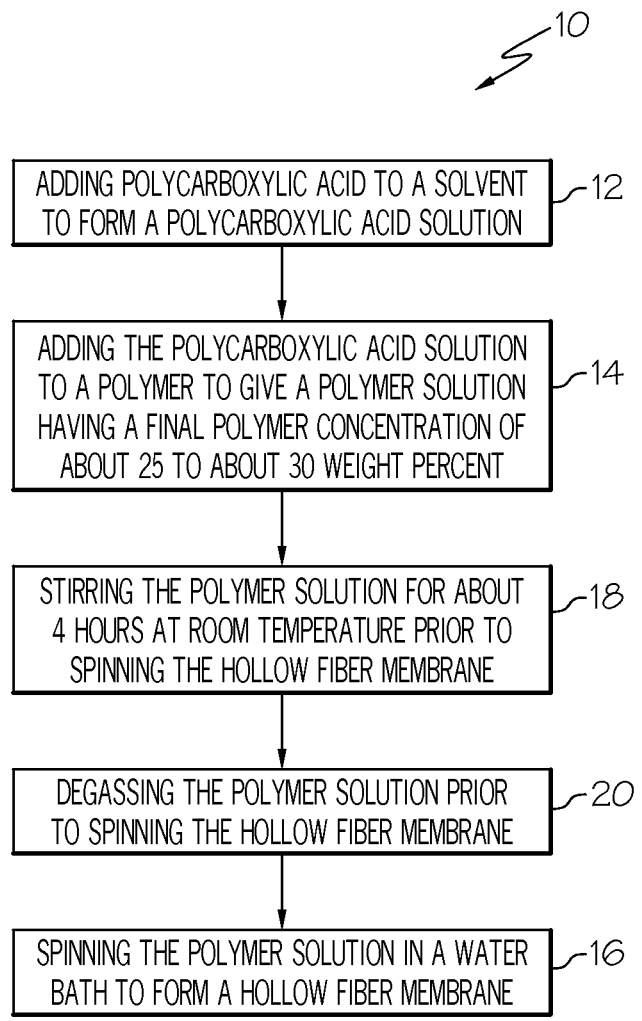
FIG. 6 is a flow chart describing a method according to an exemplary embodiment of the present invention.

Referring now to FIG. 6, there is shown a flow chart describing a method 10 for preparing a hollow fiber membrane. The method 10 may include a step 12 of adding a polycarboxylic acid to a solvent to form a polycarboxylic acid solution. In some embodiments of the present invention, the solvent may be NMP and the polycarboxylic acid may be include at least one of oxalic acid, fumaric acid, succinic acid, tartaric acid, malic acid, citric acid, and mellitic acid. In some embodiments, the polycarboxylic acid may be present from about 4 to about 10 weight percent of the resulting polycarboxylic acid solution. The method 10 may include a further step 14 of adding the polycarboxylic acid solution to a polymer to give a polymer solution having a final polymer concentration of about 25 to about 30 weight percent. The resulting polymer solution may, in a further step 16, be spun to form a hollow fiber membrane.

The method 10 may further include a step 18 of stirring the polymer solution for about 4 hours at room temperature prior to the step 16 of spinning the hollow fiber membrane. The method 10 may still further include a step 20 of degassing the polymer solution prior to the step 16 of spinning the hollow fiber membrane.

It should be understood, of course, that the foregoing relates to exemplary embodiments of the invention and that modifications may be made without departing from the spirit and scope of the invention as set forth in the following claims.

What is claimed is:

1. A polymer casting solution comprising:
   a solvent;
   a non-solvent;
   between about 0.5 to about 10 weight percent polycarboxylic acid admixed in the solvent to give a polycarboxylic acid solution, the polycarboxylic acid is selected from the group consisting of oxalic acid, fumaric acid, succinic acid, tartaric acid, malic acid, and mellitic acid; and
   a polymer dissolved in the polycarboxylic acid solution, the polymer having a concentration between about 25 and about 30 percent by weight.

2. The polymer casting solution of claim 1, wherein the solvent is selected from the group consisting of N-methyl pyrollidone, dimethyl acetamide, dimethyl formaide, and formylpiperidine.

3. The polymer casting solution of claim 2, wherein the solvent is N-methyl pyrollidone.

4. The polymer casting solution of claim 1, wherein the non-solvent is selected from the group consisting of acetone, methanol, ethanol, propanol, isopropanol, and butanol.

5. The polymer casting solution of claim 1, wherein the non-solvent is isopropanol.

6. The polymer casting solution of claim 1, wherein the solvent is present in the polycarboxylic acid solution at a concentration between about 70 and about 80 weight percent.

7. The polymer casting solution of claim 6, wherein the non-solvent is present in the polycarboxylic acid solution at a concentration between about 15 and about 25 weight percent.

8. The polymer casting solution of claim 7, wherein the polycarboxylic acid is present in the polycarboxylic acid solution at a concentration between about 4 and about 8 weight percent.

9. The polymer casting solution of claim 1, wherein the polymer is selected from the group consisting of polysulfones, poly(ether sulfones), polyimides, polycarbonates, polyphenyl ethers, polyethers, aromatic polyamides, polycarbonates, polysilicones, polyetherimides, polyestercarbonates, copolymers incorporating these polymer types, and mixtures thereof.

10. The polymer casting solution of claim 9, wherein the polymer is a polyimide.

11. A hollow fiber membrane formed by solution spinning a polymer casting solution, the polymer casting solution including a solvent, a non-solvent, between about 0.5 to about 10 weight percent of a polycarboxylic acid, the polycarboxylic acid selected from the group consisting of oxalic acid, fumaric acid, succinic acid, tartaric acid, malic acid, and mellitic add, and a polymer.

12. The hollow fiber membrane of claim 11, wherein the solvent is N-methyl pyrollidone and the non-solvent is isopropanol.

13. The hollow fiber membrane of claim 12, wherein:
the solvent is present at a concentration between about 70 to about 80 weight percent;
the non-solvent is present at a concentration between about 15 to about 25 weight percent; and
the polycarboxylic acid is present at a concentration between about 4 to about 8 weight percent.

14. A polymer casting solution comprising:
a solvent;
a non-solvent;
at least two polycarboxylic acids, the polycarboxylic acids are admixed in the solvent to give a polycarboxylic acid solution, the at least two polycarboxylic acids are selected from the group consisting of oxalic acid, fumaric acid, succinic acid, citric acid, tartaric acid, malic acid, and mellitic acid; and
a polymer dissolved in the polycarboxylic acid solution, the polymer having a concentration between about 25 and about 30 percent by weight.

\* \* \* \* \*